Reese, Gould & Lake.
Harvester Rake.
N° 2659
N° 33663
Patented Nov. 5, 1861.
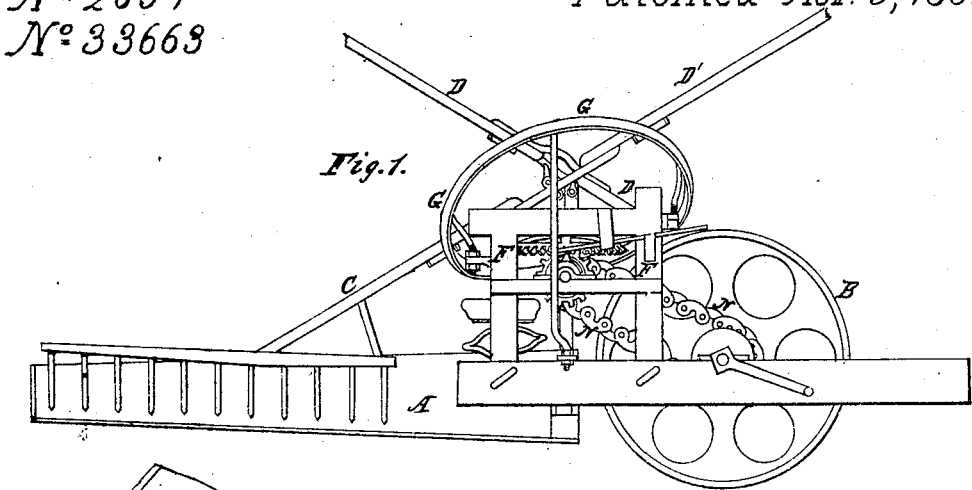
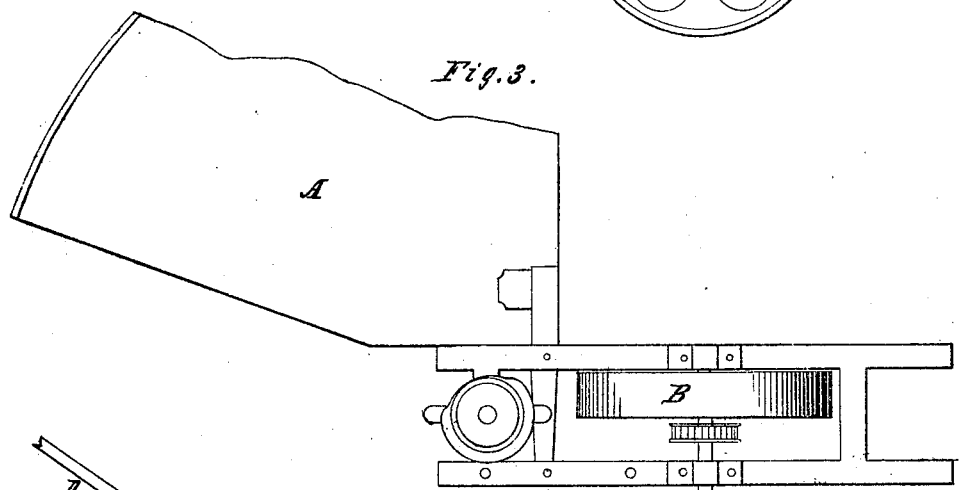
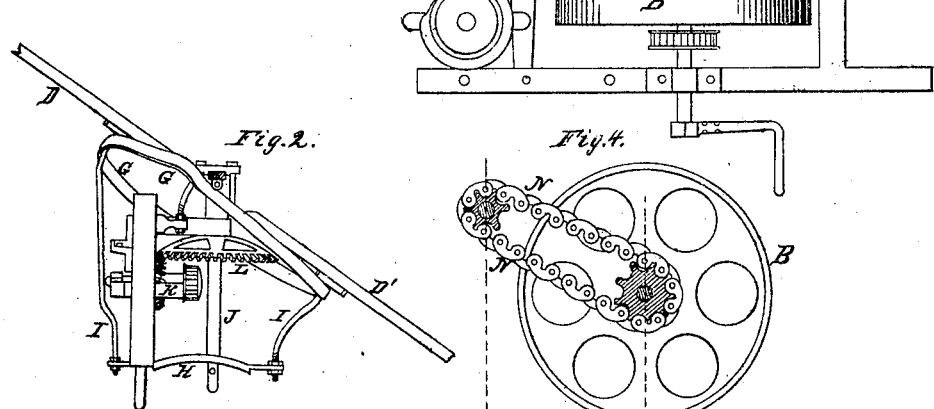
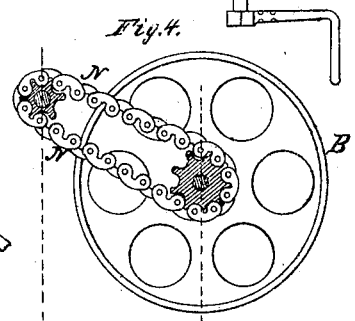
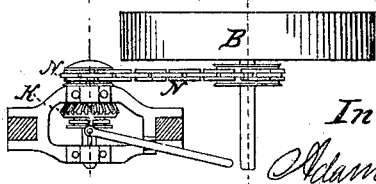
Witnesses.
D. M. Chamberlin
John Cougle
Inventors.
Adam R. Reese
William Gould
Nelson Lake

UNITED STATES PATENT OFFICE.

A. R. REESE, WM. GOULD, AND NELSON LAKE, OF PHILLIPSBURG, N. J.

IMPROVEMENT IN RAKES FOR HARVESTERS.

Specification forming part of Letters Patent No. 33,663, dated November 5, 1861.

*To all whom it may concern:*

Be it known that we, ADAM R. REESE, WILLIAM GOULD, and NELSON LAKE, of Phillipsburg, in the county of Warren and State of New Jersey, have invented a new and useful Improvement in Self-Raking Attachements to Reapers; and we do hereby declare the following to be a full, clear, and exact description thereof, reference being had to the annexed drawings, making a part of this specification, in which—

Figure 1 is an elevation of the combined machine. Fig. 2 is an end view of the rake detached. Fig. 3 is a plan of the machine with the rake removed. Fig. 4 is a view of the endless chain and pulleys. Fig. 5 is another view of the same.

The nature of our invention consists in arranging the gearing of the revolving combined self-rake and reel within an independent frame, that it may be removed entire and with little trouble from the machine, thereby converting it into a mower, as hereinafter described, and also in bracing the ring G G by braces and cross-pieces, hereinafter described.

A is the platform; B, the master-wheel.

Fig. 2 is the raking attachment. C is the rake. D D D are the blank heads which serve to bring the grain upon the platform. The rake and these blank heads thus act as a rake and reel combined. They are constructed are made to revolve in the ordinary manner. In order that this raking attachment may be conveniently removed from and placed again upon the machine, it is necessary that it should be entirely independent, in its construction, from the mower. For this purpose a frame, F F, is made, to which the ring G G is attached in any firm manner. In machines hitherto constructed this ring is stiffened by being braced to the main frame of the machine; hence when the raker is taken from the mower these parts present no firmness. In our machine the ring is braced to a cross-piece, H, by braces I I. This cross-piece H serves also for one of the bearings of the vertical shaft J. The whole of these parts therefore act as supports and braces to each other. For the purpose of regulating the speed of the rake, throwing it in and out of gear, and changing the motion derived from the master-wheel from a vertical to a horizontal motion, as is required by the rake, a small bevel-wheel, K, is placed so as to work into the bevel-wheel L. This wheel sliding on its shaft can of course be thrown in and out of gear at pleasure. On the same shaft as this beveled wheel K is a tooth-wheel, into which an endless chain, N N, works. This endless chain passes around a similar wheel on the axis of the master-wheel, and thus transmits the motion of the latter to the revolving raker. The advantage of the use of the chain over the use of gearing, as heretofore has been the custom, is obvious; and as the rake employed by us so revolves as to strike into the grain at an angle other than a right angle to the cutter-bar, if it were not for this chain much complicated machinery would be necessary to drive the rake properly. Owing to the ease with which the chain may be disconnected and adjusted, this mode of driving the rake permits the rake to be more readily detached, and the gearing necessary to drive it being all within the frame F F, the mower, when the rake is removed, is not incumbered with the gearing. The frame of the rake is fastened to the frame of the mower by pins or any other suitable device.

Having thus described our improvements, what we claim as our invention is—

1. The combination of the rake C, the blank heads D D, operating as described, and an endless chain, N N, with the removable frame F F, the whole being arranged and operating in the manner and for the purpose herein described.

2. The combination of cross-pieces H and I I with the removable frame F F, for the purpose of strengthening and supporting the ring G G, substantially as above described.

In testimony whereof we, the said ADAM R. REESE, WILLIAM GOULD, and NELSON LAKE, have hereunto set our hands.

ADAM R. REESE.
      WILLIAM GOULD.
      NELSON LAKE.

Witnesses:
 D. M. CHAMBERLIN,
 JOHN CASSELL.